US008442511B2

(12) United States Patent
Woods et al.

(10) Patent No.: US 8,442,511 B2
(45) Date of Patent: May 14, 2013

(54) MOBILE PHONE CONTROL EMPLOYS INTERRUPT UPON EXCESSIVE SPEED TO FORCE HANG-UP AND TRANSMIT HANG-UP STATE TO OTHER LOCATIONS

(76) Inventors: Richard Woods, Torrance, CA (US); Nira Schwartz, Torrance, CA (US); Nehemia Schwartz, Moshav Magshimim (IL)

( * ) Notice: Subject to any disclaimer, the term of this patent is extended or adjusted under 35 U.S.C. 154(b) by 641 days.

(21) Appl. No.: 11/470,060

(22) Filed: Sep. 5, 2006

(65) Prior Publication Data

US 2008/0057942 A1      Mar. 6, 2008

(51) Int. Cl.
H04M 3/00      (2006.01)
(52) U.S. Cl.
USPC .................. 455/420; 455/414.1; 455/404.1; 455/575.9
(58) Field of Classification Search .................. 455/420, 455/4, 404.2, 456.3–456.4
See application file for complete search history.

(56) References Cited

U.S. PATENT DOCUMENTS

| | | | | |
|---|---|---|---|---|
| 4,837,700 A * | 6/1989 | Ando et al. .................... | 701/213 |
| 5,305,308 A * | 4/1994 | English et al. ................ | 370/335 |
| 6,160,993 A * | 12/2000 | Wilson ......................... | 455/12.1 |
| 6,198,930 B1 | 3/2001 | Schipper | |
| 6,252,543 B1 * | 6/2001 | Camp ...................... | 342/357.06 |
| 6,317,684 B1 * | 11/2001 | Roeseler et al. ............. | 701/202 |
| 6,351,638 B1 * | 2/2002 | Robinson ..................... | 455/418 |
| 6,351,639 B1 * | 2/2002 | Motohashi ................... | 455/420 |
| 6,516,198 B1 * | 2/2003 | Tendler ...................... | 455/456.3 |
| 6,571,175 B1 * | 5/2003 | Chen ........................... | 701/211 |
| 6,593,878 B2 * | 7/2003 | Fall ............................. | 342/357.1 |
| 6,636,175 B2 * | 10/2003 | Russell et al. .............. | 342/357.1 |
| 6,646,873 B2 * | 11/2003 | Chu-Chia et al. ............ | 361/686 |
| 6,687,497 B1 * | 2/2004 | Parvulescu et al. .......... | 455/420 |
| 6,690,940 B1 * | 2/2004 | Brown et al. ............... | 455/456.4 |
| 6,801,778 B2 * | 10/2004 | Koorapaty et al. ........ | 455/456.1 |
| 6,807,415 B2 * | 10/2004 | Sato ............................. | 455/420 |

(Continued)

OTHER PUBLICATIONS

Newton's Telecom Dictionary, ISBN No. 1-57820-023-7 published in 1998, Author Harry Newton, Published by Telecom Books, Oct. 1998 edition.*

(Continued)

*Primary Examiner* — Rafael Pérez-Gutiérrez
*Assistant Examiner* — Suhail Khan
(74) *Attorney, Agent, or Firm* — David Pressman

(57) ABSTRACT

The embodiment of a system for remotely controlling a wireless communication mobile phone device senses its space coordinates. GPS and other data is transmitted between mobile phones to alert and/or update a user to the fact that their phone has reached a significant threshold locations, and/or has reached a significant threshold speed of within a given accuracy. A SMS message, and/or voice message, and/or a phone call, and/or a special ring, and/or a special display and/or reset signal, and/or update signal, and/or hang-up signals are cross transmit and received to alert and/or update information of the mobile phone users. This is done for improving security and save lives, controlling classified communications, improving privacy, improving machinery performance, measuring distances and speed between mobile phones, alerting and/or updating personnel of hazardous locations and hazardous speeds, for forcing hang-up of phones at times of hazardous communications, providing space coordinates of missing persons and persons in danger, controlling air shows and car racing, and controlling military, fire and police men movement.

18 Claims, 3 Drawing Sheets

U.S. PATENT DOCUMENTS

| | | | | |
|---|---|---|---|---|
| 6,816,711 B2 * | 11/2004 | Standke et al. | ............... | 455/73 |
| 6,847,825 B1 * | 1/2005 | Duvall et al. | ............... | 455/456.3 |
| 6,876,858 B1 * | 4/2005 | Duvall et al. | ............... | 455/456.1 |
| 6,975,941 B1 * | 12/2005 | Lau et al. | ............... | 701/213 |
| 6,985,753 B2 * | 1/2006 | Rodriguez et al. | ......... | 455/550.1 |
| 7,003,288 B2 * | 2/2006 | Ueda et al. | ............... | 455/418 |
| 7,010,110 B2 * | 3/2006 | Jorasch et al. | ............ | 379/207.04 |
| 7,010,270 B1 * | 3/2006 | Thomas et al. | ............ | 455/67.13 |
| 7,024,220 B2 * | 4/2006 | Forrester | ............... | 455/552.1 |
| 7,039,419 B2 | 5/2006 | Ono | | |
| 7,098,855 B2 * | 8/2006 | Kotzin et al. | ............... | 343/702 |
| 7,181,228 B2 * | 2/2007 | Boesch | ............... | 455/456.1 |
| 7,181,343 B2 * | 2/2007 | Mukaiyama | ............... | 701/200 |
| 7,193,560 B2 * | 3/2007 | Dooley et al. | ............ | 342/357.15 |
| 7,196,659 B1 * | 3/2007 | Beason et al. | ............ | 342/357.1 |
| 7,256,711 B2 * | 8/2007 | Sheha et al. | ............... | 340/995.1 |
| 7,310,534 B2 * | 12/2007 | Northcutt | ............... | 455/456.6 |
| 7,330,150 B1 * | 2/2008 | Beason et al. | ............ | 342/357.09 |
| 7,353,034 B2 * | 4/2008 | Haney | ............... | 455/457 |
| 7,362,239 B2 * | 4/2008 | Franczyk et al. | ............ | 340/936 |
| 2005/0073443 A1 * | 4/2005 | Sheha et al. | ............... | 340/995.1 |
| 2005/0255874 A1 * | 11/2005 | Stewart-Baxter et al. | . | 455/550.1 |
| 2006/0099940 A1 * | 5/2006 | Pfleging et al. | ............ | 455/419 |
| 2007/0072616 A1 * | 3/2007 | Irani | ............... | 455/441 |

OTHER PUBLICATIONS

TBB5110 by Texas Instruments at: http://www.electronicstalk.com/news.
GPS Cell Phone at: http://www.VerizonWireless.com and Motorola V600 at: http://www.thetravelinsider.info/phones/motorolav600review.htm.
AG 2550 single-chip RFIC (Radio Frequency Integrated circuit) made by AIROHA at: http://www.globalexecutiveforum.net/Chipsets.htm.
http://en.wikipedia.org/wiki/glonass.
Sprint PCS Phone Guide—2005—www.sprint.com.
Mini Poz, Poz-X315 at: http://www.pelephone.co.il/.
GPS Cell Phone at: http://www.VerizonWireless.com and.
AG 2550 single-chip RFIC (Radio Frequency Integrated circuit) made by AIROHA at: http://wwvv.globalexecutiveforum.net/Chipsets.htm.
Motorola V600 at: http://www.thetravelinsider.info/phones/motorolav600review.htm.
Sprint PCS Phone Guid—2005—www.sprint.com.
GPS Cell Phone at: http://www.VerizonWireless.com.

\* cited by examiner

Fig 1 – Prior Art

| Interrupt # | Computer Commands |
|---|---|
| 1. | Call_location_threshold_values(TLV(2), LD(2))<br>Call_Speed_threshold_values(TSV(2), SD(2))<br>Call_ cross transmit_receive(TLV(2), LD(2))<br>Call_ cross transmit_receive(TSV(2), SD(2))<br>Exit |
| 2. | Call_compare_location(ESC(2,100), TLV(2), LD(2), LCR(2,100))<br>Call_speed (ESC(2,100), MPS(2,100))<br>Call_compare_speed(MPS(2,100), TSV(2), SD(2), SCR(2,100))<br>Call_ cross transmit_receive (ESC(2,100), TLV(2), LCR(2,100))<br>Call_ cross transmit_receive (MPS(2,100), TSV(2), SCR(2,100))<br>Exit |
| 3. | Call_response_to_location(LCR(2,100), SMS, Call)<br>Call_response_to_speed(SCR(2,100), SMS, Call)<br>Call_display((ESC(2,100), MPS(2,100), SMS, Call, status=on)<br>Exit |
| 4. | Call_GPS_data(GPS(2,100))<br>Call_extended_Space_Coordinates(ESC(2,100), GPS(2,100))<br>Call_ cross transmit_receive(ESC(2,100))<br>Call_display(ESC(2,100), status=on)<br>Exit |

Fig 3

MOBILE PHONE CONTROL EMPLOYS INTERRUPT UPON EXCESSIVE SPEED TO FORCE HANG-UP AND TRANSMIT HANG-UP STATE TO OTHER LOCATIONS

BACKGROUND

1. Field of the Invention

This invention relates generally to wireless mobile telephone systems, specifically to such systems where mobile telephone performance can be controlled. It also relates to military, police, fire department, rescue team, public safety, public privacy, classified systems, and other secure and monitored communication systems.

2. Prior Art

When one mobile telephone originates a call to another mobile phone, the originating mobile phone call travels to a mobile tower, then to a mobile exchange, and then to a main exchange, which may route the call to another main exchange, or to an international exchange, depending upon where the other mobile phone is located. The call may be sent to other countries via an undersea cable or a satellite system. Other wireless phones and mobile phones may have a slightly different system configuration, including international four-band global satellite mobile phones (Quad band Global System Mobile Communication (GSMC)) with the capability to effect a wireless communication by satellite anywhere in the world, such as the Motorola V600. All references made to a "mobile phone" include mobile phones, portable phones, cell phones, PCS phones, wireless phones, together and independently.

Wireless bidirectional communications to and from mobile phones are done via an existing communication protocol, which may incorporate transmitting and receiving the phone number of the originating mobile phone, the destination's mobile phone number, the mobile phone identification number, the mobile phone's status (off/on hook), call waiting, conference call, message data, busy line, and more, depending upon the mobile phone's configuration.

Sprint Personal Communication System (PCS) phones and other mobile phones incorporate a Sending Message Service (SMS), which is a text message that one mobile phone may send to another mobile phone. The user of the originator mobile phone selects "SMS Message" on its menu, identifies the SMS mobile phone receiver by its calling number, types in the text message using the mobile phone keyboard, and presses the send button. The SMS message is displayed on the receiving phone's screen as text, an icon, or as a call back number. SMS messages may be automatically generated and sent by a mobile phone under certain conditions, for example when communication has failed, and a recording machine option is available. An SMS message may automatically updates one or more items in the mobile phone database, such as its clock time.

A central office performs diagnostic tests and records system performance on a continual basis. The central office has operational control over each and every mobile tower, and the mobile phones within the system. Identification numbers identify each mobile tower and its location coordinates. A user number identifies the mobile phone. The central office has the ability to shut down all the mobile phones communicating with a tower and or just shut down a specific mobile phone. Usually about five different company carriers use each tower and a total of about 1000 mobile phones are capable of communicating with a tower, which covers about a square mile.

A mobile phone incorporates an on-board microprocessor and a memory. The microprocessor is responsible for the communications protocol and the data transmitted and received from and to the mobile phone. Some mobile phones incorporate an on-board sensing units such as a Global Positioning System (GPS), which senses and provides space coordinate data for the mobile phone. Some mobile phones incorporate on-board sensing units such as a Local Positioning System (LPS), which also senses and provide space-coordinate data for the mobile phone. While the GPS provides space coordinates by communication with satellites, the LPS provides space coordinates by communicating with local towers and or antennas. Other mobile phones incorporate on-board sensing units, such as a Global Navigation Satellite System (known as GLONASS). All references made to a GPS include GPS and LPS, and or GLONASS, together and independently. The on-board microprocessor causes the display unit on the mobile phone to display the caller's phone number, GPS data, and more, as specified by the user and/or the telephone company. The GPS data may be displayed on the mobile phone's screen as a numeric value and or as a graphic symbol.

Today, use of mobile phones while driving is largely abused, causing the driver and his or her car to be a traffic hazard by reducing driving concentration and ignoring ambulances. This may result in accidents, causing a vehicle to becoming potentially lethal. Some jurisdictions, such as Israel, New York, and California have or are proposing laws prohibiting driving while talking on a mobile phone, unless a hands-free telephone device is used. However, fatalities resulting from driving while using regular mobile phones and/or hands-free mobile phones still exist.

The use of mobile phones is also abused in theaters, and public gatherings, invading privacy that attendees have paid for. On battlefields, an outgoing or received call can provide an enemy with the opportunity to pinpoint the location of the mobile phone. Street fighting has high casualties because mobile phone communications can provide a gunman with the locations of soldiers and police.

Alternatives to wireless mobile phone communication are available through portable computers, such as laptop, (notebook), pocket computer, palm computer, and other portable computers (hereafter portable computers) via an Internet wireless communication system and/or wireless communication system, where voice and data transfer is established. Portable computers have GPS units mounted onboard so that the space coordinates of the computers can be displayed on their screen.

Heretofore there was little communication of critical data between mobile phones and/or portable computers. Such critical data includes individual GPS data, the individual unit speed, special and various space coordinates, including emergency, private, public, military, fire, ambulance, hazard, classified. As a result, military, police, fire department, rescue team, public safety, public privacy, classified systems, were less than optimal and safety and security was compromised.

ADVANTAGES

Some advantages of one or more aspects of the invention are to provide improved wireless communication and to monitor and improve space coordinates and speed of a mobile phone device for the purpose of improving security.

Further advantages of one or more aspects will become apparent from a consideration of the ensuing description and the accompanying drawings.

SUMMARY

In accordance with one aspect, a method for remotely controlling a wireless communication mobile phone device, comprising an on-board memory, and a sensing unit for continually sensing the wireless communication mobile phone device's space coordinates. The space coordinates are stored in the on-board memory in the wireless communication mobile phone device. Then, a controller governs the wireless communication mobile phone device so that it transmits the space coordinates to an additional wireless communication mobile phone device and it receives from the additional wireless communication mobile phone device additional space coordinates for causing the wireless communication mobile phone device to store the additional space coordinates in the on-board memory, whereby user of the mobile phone device is provided with the additional mobile phone's users information.

DRAWINGS—FIGURES

FIG. 3 shows an exemplary Look-Up Table LUT with remote communication commands used in the wireless communication system.

ABREVIATIONS

ALU—Arithmetic Logic Unit
CTR—Cross Transmitted and Received
ESC—Extended Space Coordinates
GPS—Global Positioning System
LCD—Liquid Crystal Display
LCR—Location Comparison Result
LD—Location Deviation
LUT—Look-Up Table
MPS—Mobile Phone Speed
PTA—Provided To All
RF—Radio Frequency
SCR—Speed Comparison Result
SD—Speed Deviation
SMS—Sending Message Service
TLV—Threshold Location Value
TSV—Threshold Speed Value
UART—Universal Asynchronous Receiver Transmitter

DETAILED DESCRIPTION

Figure 1:
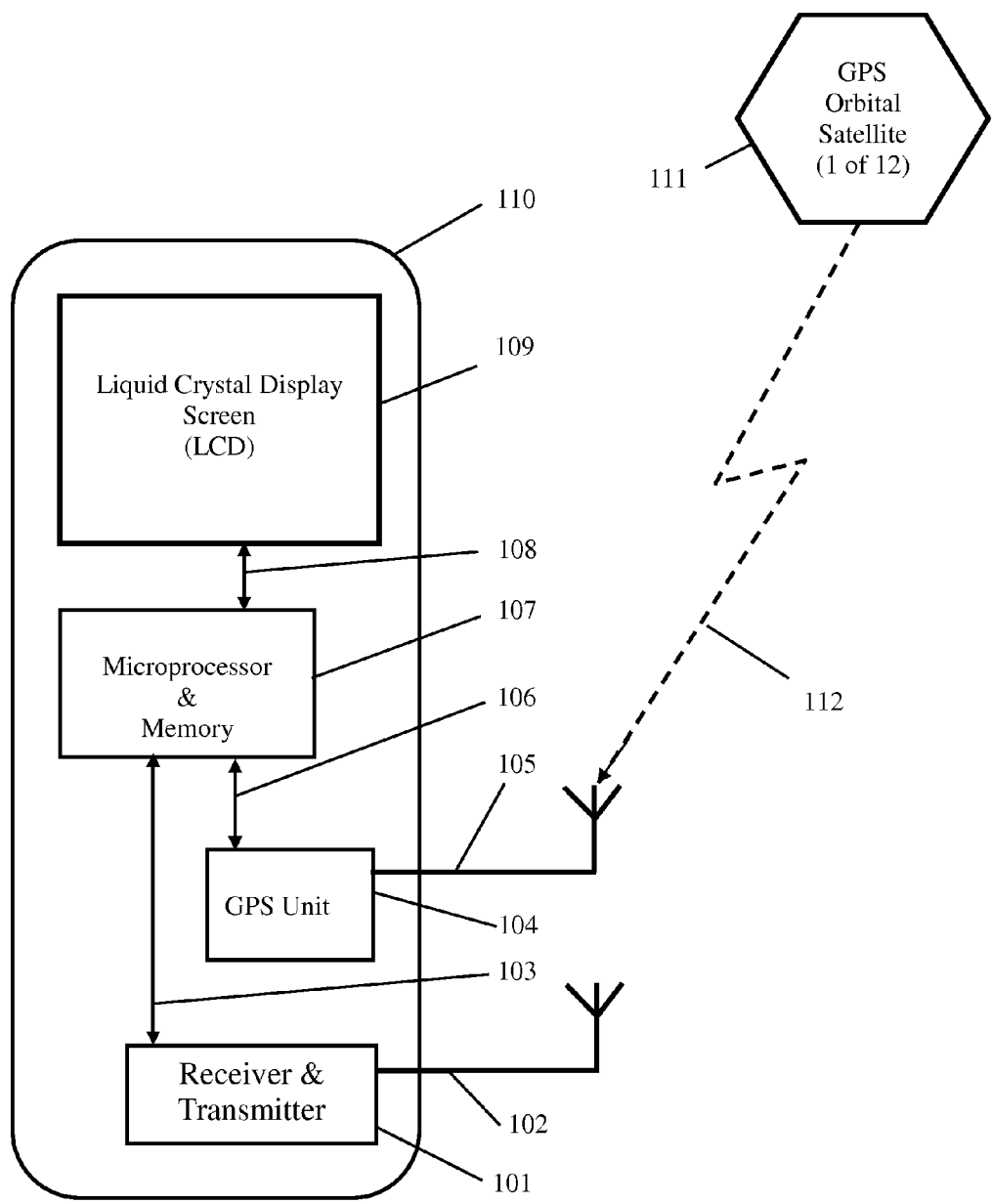
FIG. 1 shows a prior-art mobile phone, its on-board major components, and its wireless communication with one out of many orbital satellites.

Prior Art—Mobile Phone Major Components—FIG. 1

FIG. 1 shows a prior-art system that employs wireless communication between a mobile phone 110 and an orbital satellite 111. Satellite 111 is one satellite out of 12 satellites (not shown) that are orbiting at about 35,000 Km above earth, and are spaced from each other. There are 36 satellites (not shown) around the globe to cover possible communications with the entire world, and each GPS unit has 12 receivers may communicate with up to 12 satellites. The phone has a Liquid Crystal Display (LCD) screen 109, an on-board microprocessor and memory 107, a mobile phone receiver and transmitter 101 with an antenna 102, a Global Positioning System (GPS) unit 104, and a GPS receiving antenna 105. The GPS unit is an off-the-shelf unit, such as a MAX2740 made by Maxim Inc., and outputs digital data that continuously provides the space coordinates of the mobile phone in a predetermined format. Antenna 105 receives signals 112 from GPS orbital satellite 111 so that it can continuously compute and indicate its space location. Each mobile phone's GPS unit 104 has 12 internal receivers to allow wireless communications via signal 112 with eleven additional different orbital satellites (not shown) and accurately determines the continuous space coordinates of the mobile phone within accuracy of less than 0.5 m, with a reading taken every second.

Microprocessor 107 provides the mobile phone's space coordinates to LCD screen 109 by communication link 108. The mobile phone's space coordinates are displayed as text data.

Mobile phone 110 performs voice and SMS communications with other similar mobile phones (not shown) using receiver and transmitter 101. Microprocessor 107 passes the mobile phone's digitized voice and the SMS digitized data (not shown), to receiver and transmitter 101 via link 103, which in turn passes the digitized data to antenna 102 to be transmitted to a receiving mobile phone (not shown), using wireless communication towers (not shown), and or to a communication satellite (not shown). Receiver and transmitter 101 receives digital voice data and SMS data from antenna 102, and passes the information by communication link 103 to microprocessor 107, to be sent via link 108 to screen 109, which displays it. Also the data is sent to a speaker in phone 110 (not shown) so that it can be heard by a user.

Figure 2:
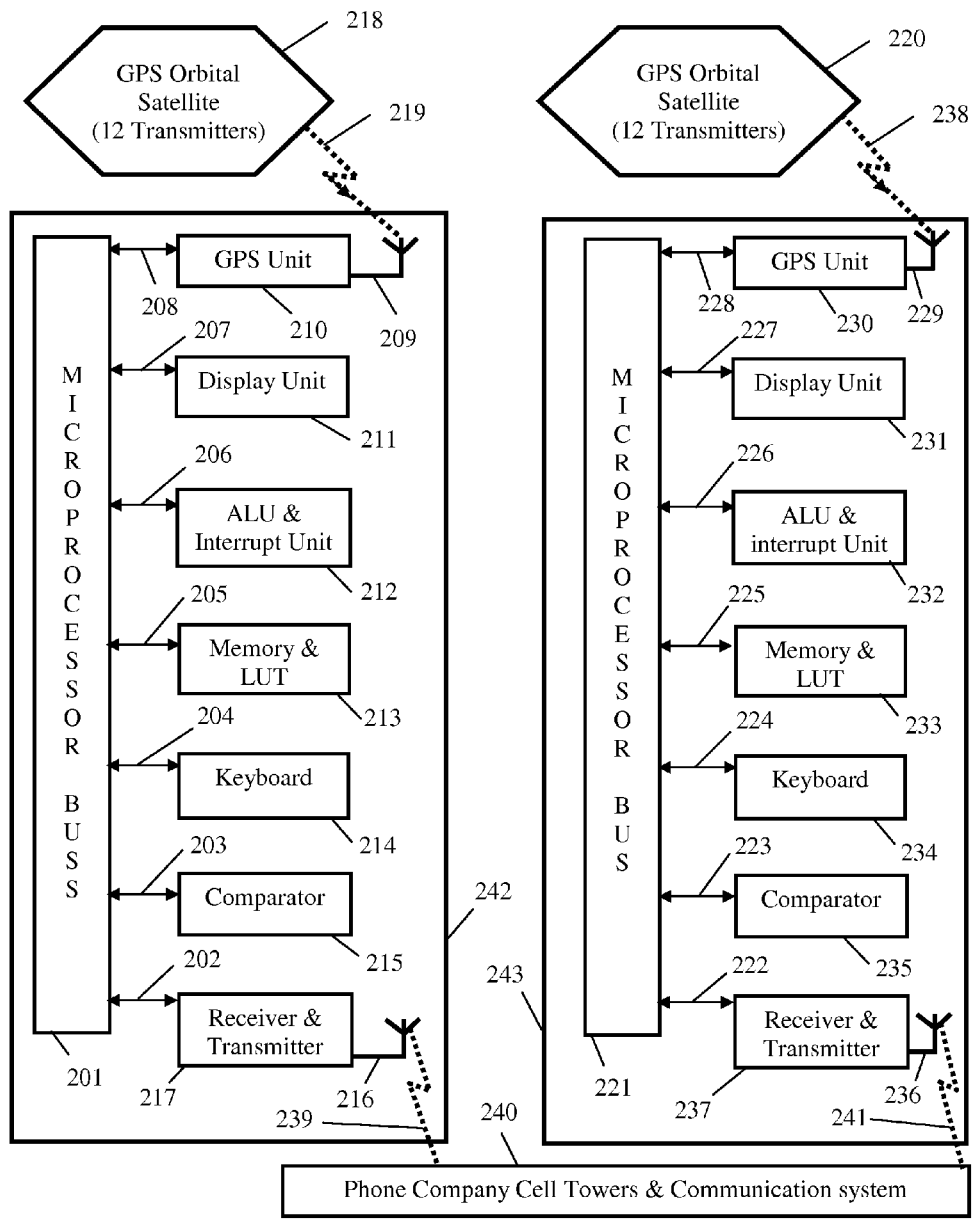
FIG. 2 shows a block diagram of two mobile phones and a wireless communication system employing orbital satellites, in accordance with one aspect of the invention.

System With Remote Control Of Wireless Communication—Description—FIG. 2

In accordance with one aspect, FIG. 2 shows a block diagram of two mobile phones 242 and 243 respectively. The on-board microprocessors' components are Arithmetic Logic Unit (ALU) and interrupt units 212 and 232, Memory and Look-Up Table (LUT) units 213 and 233, and microprocessor busses 201 and 221 (hereafter microprocessor components). Additional mobile phone components are comparator units 215 and 235, GPS units 210 and 230, display units 211 and 231, keyboard units 214 and 234, receiver and transmitter units 217 and 237, and their receiving and transmitting antennas 216 and 236, respectively.

A typical on-board microprocessor is a TBB5 110 by Texas Instruments. The microprocessor commands are well known, they are written in C, C++, and/or Java languages, and are documented in the microprocessor TBB5110 user manual by Texas Instruments. An off-the-shelf USB (Universal Service Buss) may be used for on-board communications. GPS units 210 and 230, with their receiving antennas 209 and 229, are off-the-shelf units, such as are made by Garmin Inc. Receiver and transmitter units 217 and 237 are an off-the-shelf UART (Universal Asynchronous Receiver Transmitter) chips, together with an AG 2550 single-chip RFIC (Radio Frequency Integrated circuit) made by AIROHA of Taiwan for quad-band phones. Comparator units 215 and 235 are off-the-shelf chips produced by Motorola and/or Texas Instruments. Display units 211 and 231 are off-the-shelf LCD screens. The programming commands for the mobile phone's GPS unit, the USB unit, the UART unit, the RFIC, the comparator unit, the display unit, the keyboard unit, and the microprocessor unit are well known.

FIG. 2—Operation

In accordance with one aspect, a sensing GPS unit is mounted within a mobile phone to provide its space coordinate data to its microprocessor and to off-board microprocessors located on a group of mobile phones. Each member of the group of mobile phones generates its own GPS data, which is transmitted between them using their on-board receiving and transmitting units and a wireless communication system. Each GPS datum is appended with the originator mobile phone identification number to differentiate between different GPS data. The appending can take place at the mobile phone transmitter prior to the transmission of the GPS data and/or at the receiver mobile phone after the receiving of the GPS data. (A group of mobile phones can be just one mobile phone). One or a plurality of Selected Space Coordinates is stored in each group of mobile phones' memories as a Threshold Location Value (TLV). A TLV is a set of space coordinates that cause the wireless system to initiate a warning upon a mobile phone reaching this location. The group of mobile phones will receive and or transmit to each other various parameters, such as their own GPS data; TLV; SMS data with alerting and/or updating information; a phone call; a signal; a hang-up signal; a resetting signal; or a voice alarm. This is done if any of the mobile phones' GPS data is near a TLV within a given accuracy of Location Deviation (LD). The LD is a set of coordinates that identify a three, and/or two, and/or one-dimensional space coordinates.

In an additional mode of operation the TLV may identify a fire center and the LD space coordinates may identify the fire zone, and the firefighters' safety is guarded by their GPS locations with respect to the TLV and the LD coordinates. The TLV and/or the LD may be continually updated as the fire moves in the forest, and/or building stories and/or one time set. Providing a mobile phone user with a tool to identify location of their peers in a dangerous environment provides help, improves safety and movement in dangerous environment's helping to save life. Another mode of operation occurs when the TLV identifies a traffic accident and the LD will identify the path to the hospital, and/or the path to the ambulance, where all of the traffic signals must be turned green, thus giving priority to the ambulance path, providing a tool to improve public safety. Another mode of operation occurs when a traffic location is identified as TLV and the LD defines a zone where classified communication can take place between mobile phones, improving privacy, security and classification communication.

In an additional mode of operation a SMS message, and/or SMS alternatives, and/or a voice message, and/or a phone call, and/or a special ring, and/or a special display, and/or a reset signal, and/or update signal, and/or hang-up signals may continually update the TLV and/or the LD value.

In an additional mode of operation, the GPS data of each phone in a group of mobile phones is displayed on an LCD screen as text or as graphics symbol. The mobile phone's LCD screen may display a geographical map on which the GPS data of one mobile phone, and/or entire group of mobile phones is projected. In an additional mode of operation, the distance between the phones in the group of mobile phones is displayed as text and or graphics symbol. Another mode of display may employ graphics symbols where lines connect each and every member of the group of mobile phones; such lines displayed along with the relevant distance and are projected onto over a geographical map.

In an additional mode of operation, GPS data history for a group of mobile phones is saved in an on-board memory. The recent movement history of the group is recorded and is displayed on the LCD screen as text or as graphic data. The size of the GPS data history is selected by the use of the mobile phone's keyboard, and/or remotely updated.

In an additional mode of operation, each mobile phone's movement speed is also calculated by storing the space coordinates of the wireless communication mobile phone device at successive times to obtain two space coordinates. The two space coordinates are subtracted from each other to obtain a difference which divided by the time interval between the successive times. Each of the mobile phones will transmit its movement speed to the other mobile phones. The Mobile Phone Speed (MPS) received will be saved in the on-board memories of the mobile phones to create a speed history for each of the phones. A TSV (threshold speed value) is identified and stored in each phone's memory. A TSV is a speed that will cause the wireless system to initiate a warning when the mobile phone's speed reaches this value. The group of mobile phones will receive and or transmit each other various parameters such as their own Mobile Phone Speed (MPS) data; and/or SMS data with alerting and/or updating information; and/or TSV; and/or a phone call; and/or a signal; and/or a hang-up signal; and/or a resetting signal; and/or a voice alarm. This is done if any of the mobile phones' MPS data is near TSV within a given accuracy of Speed Deviation (SD).

In an additional mode of operation, each MPS is derived by the use of Doppler phase shift phenomena detected on the wireless communication transmission to and from each mobile cell phone, which currently operates between the ranges of 800 to 1900 MHz. A monolithic Doppler phase shifter will evaluate the speed of the mobile phone.

In an additional mode of operation, the group of mobile phones may have one or more master mobile phones to dynamically control the group parameters such as the group size to indicate who transmits and who receives each other's GPS data and at what time, the current display mode or the type of alarm message. Each mobile phone may override the master selection on it own mobile phone.

In accordance with one aspect an alternative to wireless mobile phone communication is the use of wireless portable computer communication via the Internet, using a laptop, or a notebook computer, or pocket computer, or palm computer.

The system remotely controls mobile phone's wireless communication by continuously sensing its space coordinates and storing the results in an on-board memory. Then the phone device repeatedly transmits its space coordinates to an additional wireless communication mobile phone device (not shown) and receives from the additional device additional space coordinates for causing the wireless communication mobile phone device to store the additional space coordinates in its on-board memory. The space coordinates are compared with pre-selected space coordinates, which were previously stored in the on-board memory. The comparison results identify data arriving at the designated location by a SMS message, and/or SMS alternatives, and/or a voice message, and/or a phone call, and/or a special ring, and/or a special display, and/or a reset signal, and/or hang-up signals.

The system is used to save life, to monitor movements in the vicinity of hazardous materials, danger environment, to secure military, fire and police personnel, to improve privacy, to improve communication security, to improve classified communication, to prevent race cars spinning out of control at dangerous corners, to prevent speeding cars from becoming lethal, to enable families to monitor their children arriving at school, to retrieve lost disoriented persons, to back up secure systems that fail, such as trains that need to slow down to allow another train to cross the road, to monitor air shows by monitoring the relative speed between airplanes to prevent collisions, etc.

For example, SMS messages can continually update the TLV and/or the LD of a mobile phone located on an airplane to alert and/or update to the dangerous distance it needs to keep away from additional airplane. An additional example is a SMS messages used to continually update the TLV and/or the LD of a mobile phone located in a car during traffic for the purpose of clearing the way for ambulances, for emergency, and/or for security, and/or for initiate classified communications.

One aspect of the system operation is to store in LUTs 213 and 233 a list of commands. An electronic pointer points to a location within each LUT to cause the microprocessor's components to perform the set of commands indicated by the pointer. Interrupt units 212 and 232 provide these pointers by periodically pointing to a specific location in the LUT. There are about 128 interrupts, and this number depends on the microprocessor manufacturer. A number between 0 and 127 identifies each of the interrupts. Each hardware interrupt is assigned by the manufacturer to point to a specific address in memory at which the processing commands execute. When software interrupts are used, the algorithms load the interrupt vectors with the addresses they point to in memory. A set of commands pointed by an interrupt must be executed prior to the next interrupt to allow correct operation. The interrupts commands are well known. ALU and interrupt units 212 and 232 create an SMS message, an SMS alternative, a voice message, a phone call, a special ring, a reset signal, an update signal, hang-up signals, and/or special displays that are packed in known format prior to sending a cross transmit and receive alert and/or updating information between phones 242 and 243.

An additional aspect of the system operation occurs when data is placed on busses 201 and 221 by the mobile phones' GPS units 210 and 230, display units 211 and 231, ALU units 212 and 232, memory and LUT units 213 and 233, keyboard units 214 and 234, comparator units 215 and 235, and/or receiver and transmitter units 217 and 237. This is done via communication links 208 and 228, 207 and 227, 206 and 226, 205 and 225, 204 and 224, 203 and 223, 202 and 222, respectively. Such data is provided to all (PTA) in the system and this data is accessible for use by each of these components. The programming commands to provide data to all are well known.

A further aspect of the system's operation accurse when the mobile phones' receiver-transmitter units 217 and 237, with their receiving and transmitting antennas 216 and 236, and phone company cell towers and communication system 240 provide bi-directional wireless communication data paths 239 and 241. When the mobile phones transmit or receive each other's data, their receiver and transmitter units 217 and 237 place the data on busses 201 and 221 by communication links 202 and 222. This is known as "Cross Transmit and Receive".

Then wireless communication links 219 and 238 connect GPS units 210 and 230 to GPS orbital satellites 218 and 220, respectively. GPS units 210 and 230 each have twelve internal receivers to allow them to communicate with twelve satellites and accurately determine the space coordinates of the mobile phone within few centimeters. Each GPS unit communicates with up to twelve satellites directly above. Satellites 218 and 220 represent one out of the twelve possible satellites that the GPS unit can communicate with. There are thirty-six satellites around the globe. GPS units 210 and 230 output digital data that continuously provide the space coordinates of mobile phone units 242 and 243 in a predetermined format.

A further aspect of the system operation is to append to the outputs of GPS units 210 and 230 data including the time T at which the space coordinates were acquired. The ID numbers of mobile phones 242 and 243 are appended to their space coordinates resulting in new Extended Space Coordinates (ESC) data at GPS units 210 and 230, respectively. Time T is available on each mobile phone by an on-board clock (not shown). This ESC data identifies which mobile phone created the data and at what time the GPS data was created. The ESC data in units 210 and 230 are placed on busses 201 and 221 by communication links 208 and 228 to be provided to all (PTA) in the system. The ESC data is cross-transmitted and received between phones 242 and 243 and stored in memories 213 and 233. Therefore each mobile phone is provided with the other mobile phone's space coordinate data and the time the data was produced. The appending of a mobile phone's GPS data with its identification number can be done on board and/or at the receiving mobile phone. Appending is possible because communication protocols between mobile phones 242 and 243 cross-transmit and receive to and from each other the mobile phones' identification numbers, including their LTV, their LD, their STV, their SD, and/or their space coordinates. This exchange of information between mobile phones is also referred as broadcasting.

In one mode of operation, the ESC data is displayed as graphic symbol and/or as a table on display units 211 and 231. The ESC can be projected over a geographical map to restore history route by displaying prior space coordinates stored in memories 213 and 233 for each mobile phone in the group.

In an additional mode of operation a SMS message, and/or SMS alternatives, and/or a voice message, and/or a phone call, and/or a special ring, and/or a special display, and/or a reset signal, and/or update signal, and/or hang-up signals may continually update additional systems, such as traffic signals system, classified systems, military systems, police and/or fire departments systems, public service systems, ambulances systems, airport safety systems, with the mobile phone's space coordinates, GPS, ESC, TLV, TSV, LCR, LD, MPS, SCR, SD value.

Then the system is loaded and continually updated with new TLV and LD values. TLV and LD data are created by using keyboard units 214 and 234 and are placed on buses 201 and 221 by communication links 204 and 224 to be provided to all in the system. For example TLV may identify an entrance location of a gas tank, and LD its dimensions around this entrance location, to alert and/or update firemen of the danger. E.g., the TLV may identify the location of a gunman, and the LD will identify the area where mobile phones need to be disabled to prevent wireless communication between the gunman and his or her support. The value TLV and/or LD may be continually updated and reset by a SMS message, and/or SMS alternatives, and/or a voice message, and/or a phone call, and/or a special ring, and/or a special display, and/or a reset signal, and/or update signal, and/or hang-up signals.

A further aspect of the system operation occurs when comparator units 215 and 235 compare the ESC data with TLV by subtracting the two values to find whether the location comparison result (LCR) is smaller than the LD. The resulting data is paced on buses 201 and 221 by communication links 203 and 223 to be provided to all in the system. The TLV, LD, and location comparison results (LCR) data are cross-transmitted and received between phones 242 and 243 and stored in memories 213 and 233 and are continually updated and/or reset by a SMS message, and/or SMS alternatives, and/or a voice message, and/or a phone call, and/or a special ring, and/or a special display, a reset signal, and/or hang-up signals. Display units 211 and 231 display the ESC, TLV, LD, and/or LCR data as graphic symbols and/or as a table.

Then results are analyzed. When the location comparison result (LCR) is smaller than the LD, ALU and interrupt units 212 and 232 create SMS messages that are cross-transmitted and received between phones 242 and 243. Alternatively, in lieu of the SMS message, the units can create a voice message, and/or a phone call, and/or a special ring, and/or a special display and/or reset signal, and/or update signal, and/ or hang-up signals that are cross-transmitted and received to alert and to update phones 242 and 243 with each other's recent information.

Threshold speed value (TSV) and Speed Deviation (SD) data are created by the use of keyboard units 214 and 234 and are placed on buses 201 and 221 by communication links 204 and 224 to be provided to all in the system. The values TSV and/or SD are cross-transmitted and received between phones 242 and 243 and are continually updated and/or reset by a SMS message, and/or SMS alternatives, and/or a voice message, and/or a phone call, and/or a special ring, and/or a special display, and/or a reset signal, and/or hang-up signals.

A still further aspect of the system's operation occurs where comparator units 215 and 235 calculate the MPS of units 242 and 243 by subtracting each mobile phone's ESC data created at time T from its ESC data created at a consecutive time T+ΔT. ΔT is the difference in time between two ESC events. The difference is then divided by ΔT. The values of T and T+ΔT are available in an on-board clock (not shown). Comparator units 215 and 235 compare the MPS with the TSV to find whether the speed comparison result (SCR) is larger than the SD and place the result of the comparison on busses 201 and 221 by communication links 203 and 223 to be provided to all in the system. The ESC, MSP, SD, and SCR data are cross-transmitted and received between phones 242 and 243 and stored in memories 213 and 233. Display units 211 and 231 display ESC, MSP, SD and SCR data as graphic symbol and or as a table.

Then the results are analyzed. When the speed comparison result (SCR) is larger than the SD, ALU and interrupt units 212 and 232 create an SMS message that is cross-transmitted and received between phones 242 and 243 to alert and/or update the phone users with the recent information. Alternatively a voice message, and/or a phone call, and/or a special ring, and/or a special display and/or reset signal, and/or hang-up signals can be created to be cross-transmitted and received between phones 242 and 243 to alert and/or to update their users with each other recent information.

Interrupt units 212 and 232 continuously activate commands stored in LUT units 213 and 233. An exemplary set of LUT commands is shown in FIG. 3.

Look Up table (LUT) and Algorithm Flowchart—FIG. 3

FIG. 3 shows a look up table (LUT) which is a memory array, preferably 32 Mbytes in size, that has four entrances (column 1) that represent address locations in the memory. The four entrances are at addresses 5 Mbytes, 16 Mbytes, 21 Mbytes, and 29 Mbytes, respectively. Entrance #1 is the first LUT address at 5 Mbytes points Interrupt #1; Interrupt #2 points to a second address at 16 Mbytes; Interrupt #3 points to third address at 21 Mbytes; and Interrupt #4 points to a fourth address at 29 Mbytes. Interrupt units 212 and 232 (FIG. 2) generate these interrupts.

Column 2 of the table depicts the actual processor commands that are contained in the LUT memory after each of the address locations. All the commands stored after the first entrance must occupy less memory than 11 Mbytes, which is the difference between two-memory addresses 5 Mbytes and 16 Mbytes.

The LUT of FIG. 3 is one of two identical LUT units 213 and 233 and their list of commands stored in memories 213 and 233 (FIG. 2). A second LUT (not shown) performs in a similar way to the first LUT on shown in FIG. 3. The second LUT have same commands and is identical to the first LUT.

Each of the four entrances or interrupts periodically forces commands to be executed. It is simplest to start with Interrupt #4. Interrupt #4 is a hardware interrupt that periodically forces the commands stored at address 29 Mbytes et seq. to be executed every three seconds. The commands at the fourth LUT entrance of each of the mobile phones continuously acquire the mobile phone's GPS data every three seconds, append to it the mobile phone's calling number at the time the event took place, storing the appended data as ESC in memory. Then the mobile phones cross-transmit and receive between phones 242 and 243, the ESC data and display it on the screen as a table or graphics symbol. Each mobile phone has each other's space coordinate data and the time the data was created.

Interrupt #1 is another hardware interrupt that periodically forces the commands stored at address 5 Mbytes et seq. to be executed every second. The commands at the first LUT entrance of each of the mobile phones acquire the mobile phone's TLV and LD data, following the acquisition of the mobile phone's TSV and SD and storing the data in the phone's memory. Then the two mobile phones continuously cross-transmit and receive, between phones 242 and 243, the TLV, LD, TSV, and SD data and display it on the screen as a table or graphics symbol.

Interrupt #2 is a third hardware interrupt that periodically forces the commands stored at address 16 Mbytes et seq. to be executed every 1.5 seconds. The commands at second LUT entrance of each of the mobile phones compares ESC with the TLV and analyzes the location comparison results in units 213 and 233 and stores the result in memory units 213 and 233, respectively. Then MPS is calculated by subtracting two consecutive GPS data, and the difference is divided by the time interval between the two events. Then the MPS data is compared with TSV data, and the result of the comparison is stored as a speed comparison result (SCR) in memory. Then the mobile phones continuously cross transmit receive between phones 242 and 243 the ESC, LCR, SCR, and MPS, causing each mobile phone to store each other's speed, and whether each phone came close enough to the TLV within a LD and to the TSV within a SD.

Interrupt #3 is the fourth hardware interrupt that periodically forces the commands stored at address 21 Mbytes et seq. to be executed every 2 seconds. The commands at the third LUT entrance validate whether the location comparison results (LCR) data is smaller than a binary ONE and if so an SMS message is cross-transmitted and received between phones 242 and 243. The command determines whether the speed comparison result (SCR) is larger than a binary ONE and if so an SMS message is cross-transmitted and received between phones 242 and 243. Alternatively, ALU and Interrupt Units 212 and 232 can create a voice message, and/or a phone call, and/or a special ring, and/or a special display and/or reset signal, and/or update signal, and/or hang-up signals.

The LUT subroutine parameters are two-dimensional matrices GPS(x,y), ESC(x,y), MPS(x,y) and one- dimensional vectors TLV(x), LD(x), LCR(x), TSV(x), SD(x), SCR (x). A matrix and/or vector identify an memory addresses where data and/or commands are stored. When x=1 the matrix and vectors store data for first phone, and when x=2, for second phone. When y=1,100 this indicates that a column of 100 locations stores the history for each respective phone. The matrices and their parameters are defined as a global type and therefore their data is provided to all in the system continuously.

Electronic interrupts are hardware and/or software interrupts that periodically point to a specific location in memories 213 and 233, respectively. An electronic interrupt in units 212 and 232 points to a location within memories 213 and 233 and will cause the microprocessor's components (FIG. 2) to execute the set of commands indicated by the pointer. The relevant LUT commands are placed at the relevant memory locations, to be pointed to by the interrupts.

The commands located on the fourth entrance of LUTs 213 and 233, respectively, run continuously every three seconds and call for a subroutine named "Call_GPS_data(GPS(2, 100))". This subroutine stores the most recent 100 space coordinates in GPS(x=1,y=1,100) and GPS(x=2, y=1,100) for mobile phones 242 and 243, respectively. GPS units 210 and 230 acquire data by continuously looping, waiting for new GPS data, a process called poling. Then the algorithms continue to call a subroutine named "Call_extended_Space_ Coordinates (ESC(2,100), GPS (2,100))". This subroutine appends, to the data stored in GPS(x=1, y=1,100), the number of mobile phone 242 and the time the appending took place. It also appends to the data stored in GPS(x=2, y=1,100) the number of mobile phone 243 and the time the appending took place. The result is stored in matrix ESC(2,100).

The algorithms continue to call the subroutine "Call_cros_ transmit_receive (ESC(2,100))". This subroutine is cross-transmitted and received between phones 242 and 243 the data in matrix ESC(2,100), and stores it in memories 213 and 233, respectively. Each mobile phone is provided with the other mobile phone's space coordinates.

Then the algorithms go on to call a subroutine named "Call_display(ESC(2,100), status=on)". This subroutine displays matrix ESC(2,100) on display screens 211 and 231 when the status flag is identified by ON. The flag is set by keyboard units 214 and 234. Otherwise the algorithms will exit this set of commands. The programming commands are well known.

The commands at the first entrance of LUTs 213 and 233 are executed every second and call for a subroutine named "Call_location_threshold_values(TLV(2), LD(2))". This subroutine stores the threshold location and location deviation in TLV(x=1) and LD(x=1) and in TLV(x=2) and LD(x=2) in mobile phones 242 and 243 by acquiring the data from keyboard units 214 and 234, respectively.

Then the algorithms continue to call a subroutine "Call_ Speed_threshold_values (TSV(2), SD(2))". This subroutine stores threshold speed and speed deviation in TSV(x=1) and SD(x=1) and in TSV(x=2) and SD(x=2) for mobile phones 242 and 243, respectively. The data is acquired from keyboards 214 and 234, respectively, and/or continually updated and/or reset by a SMS message, and/or SMS alternatives, and/or a voice message, and/or a phone call, and/or a special ring, and/or a special display, and/or a reset signal, and/or hang-up signals by cross- transmitting and receiving between phones 242 and 243.

Then the algorithms go on to call subroutine "Call_cross-transmit_receive(TLV(2), LD(2))". This subroutine cross-transmits and receives between phones 242 and 243 and the vectors TLV(2) and LD(2), and stores them in memories 213 and 233, respectively. The data is continually updated and/or reset by a SMS message, and/or SMS alternatives, and/or a voice message, and/or a phone call, a special ring, and/or a special display, and/or a reset signal, and/or hang-up signals by cross-transmitted and received between phones 242 and 243. Each mobile phone has the other mobile phone's threshold and location deviation data.

Then the algorithms continue to call the subroutine named "Call_cross transmit_receive(TSV(2), SD(2))". This subroutine cross-transmits and receives between phones 242 and 243 and vectors TSV(2) and SD(2), and stores them in memories 213 and 233, respectively. The data is continually updated and/or reset by a SMS message, and/or SMS alternatives, and/or a voice message, and/or a phone call, and/or a special ring, and/or a special display, and/or a reset signal, and/or hang-up signals by cross-transmitting and receiving between phones 242 and 243. Each mobile phone is provided with the other mobile phone's threshold speed and speed deviation data. Then the algorithms exit this set of commands. The programming commands are well known.

The commands at the second entrance of LUTs 213 and 233 are executed every 1.5 seconds and call for the subroutine "Call_compare_location(ESC(2,100), TLV(2), LD(2), LCR (2,100))". This subroutine, on mobile phone 243, subtracts the value stored in TLV(x=1) from each of the 100 locations of matrix ESP(x=1, y=1,100) to find if the result is smaller than LD(x=1). If so a binary ONE is stored in matrix LCR (x=1, y=1,100). Otherwise a binary ZERO is stored. On mobile phone 243, a subroutine does the same with x=2. These subroutines provide the distances of mobile phones 242 and 243 from their threshold location within a given LD.

The algorithms continue to call the subroutine "Call_speed (ESC(2,100), MPS(2,100))". This subroutine calculates the speed of mobile phone 242 by subtracting data ESC(x=1, y=1) created at time T1 from data ESC(x=1,y=I+1) created at time T2. Then it divides the difference by (T1−T2), for I=1, 100, and stores the result in MPS(x=1,100). The speed of mobile phone 243 is calculated the same way with x=2. These subroutines provide the speed at which mobile phones 242 and 243 are moving.

Then the algorithms go on to call a subroutine "Call_compare_speed(MPS(2,100), TSV(2), SD(2), SCR(2,100))". On mobile phone 242, this subroutine subtracts the value stored in TSV(x=1) from each of the 100 locations of matrix MPS (x=1, y=1,100) to find if the result is larger than the value stored in SD(x=1). If so then a binary ONE is stored matrix SCR(x=1, y=1,100); otherwise a binary ZERO is stored. On mobile phone 243 a subroutine does the same with x=2. These subroutines provide the speed of mobile phones 242 and 243 from their threshold speed within a given SD.

Then algorithms continue to call a subroutine "Call_cross transmit_receive (ESC(2,100), TLV(2), LCR(2,100))" followed by the subroutine "Call_cross transmit_receive (MPS (2,100), TSV(2), SCR(2,100))". The first subroutine is arranged cross transmit receive (CTR) the data In matrices ESC,LCR, and vector TLV(2) between phones 242 and 243 Then the second subroutine is arranged to cross transmit receive (CTR) the data in matrices MPS, SCR, and vector TSV between phones 242 and 243. Each mobile phone has the other mobile phone's speed, extended space coordinates, threshold data, and comparison results. Then the algorithms exit this set of commands. The programming commands are well known.

The commands at the third entrance of LUTs 213 and 233 are executed every two seconds and call for the subroutine "Call_response_to_location(LCR(2,100), SMS, Call)" followed by the subroutine "Call_response_to_speed(SCR(2, 100), SMS, Call)". These subroutines check the data in LCR (x=1, y=0), LCR(x=2, y=0), and in SCR(x=1, y=0), SCR (x=2,y=0) to determine whether the value stored is a ONE. If so, a cross-transmission and reception between phones 242 and 243 an SMS message, and/or a phone "call", and/or reset signal, and/or update signal, and/or hang-up signals, and or voice message will occur.

Then the algorithms go on to call the subroutine "Call_display((ESC(2,100), MPS(2,100), SMS, Call, status=on)" These subroutines display matrixes ESC, MPS, vectors TLV, LCR and, TSV, SCR on display screens 211 and 231 when the status flag is identified as ON. The matrix is displayed as a text table and or graphics symbol. Otherwise the algorithms exit this set of commands. The programming commands are well known.

In lieu of the LUT table shown, other methods of controlling commands can be used to control the mobile phones' wireless communications. These methods comprise sensing the wireless communication mobile phone device's space coordinates, and storing the results in the on-board memory. Then space coordinate results are continuously cross-transmitted and received between an additional wireless communication mobile phone device, thereby continuously providing a group of mobile phone device's users with each other's updated information.

Conclusion, Ramifications and Scope

Accordingly the reader will see that, according to one aspect, we have provided a method and apparatus to transmit and receive global positioning data (GPS) between one and/or a group of several mobile phones. E.g., while extinguishing a fire, the fire firefighters transmit and receive each other's GPS data, for monitoring each one's location, to provide help in case one or more are lost, harmed, and/or injured.

According to one or more aspects, we have appended to each mobile phone's GPS data its phone number and the time the appending was executed. This creates ESCs, and cross-transmissions and receptions between phones 242 and 243 the ESC data between mobile phones. We have also provided one and or several mobile phone threshold locations to be compared with ESC locations. Upon reaching threshold locations with a given accuracy and/or within a given zone, the fact is cross-transmitted and received between mobile phones as an SMS message, and/or SMS alternatives, and/or a phone call, and/or a reset signal, and/or an update signal, and/or a hang-up signals, and/or a voice message, and/or display data.

The method and apparatus can use one and/or several mobile phones' GPS for calculating their speed, and provide wireless communication between one and or a group of several mobile phones their speed and location data.

One and/or several mobile phone threshold speeds can be compared with other mobile phone speeds within a given accuracy. A user can be alerted and/or updated to this fact by cross transmission and reception between phones 242 and 243, a SMS message, and/or a phone call, and/or a reset signal, and/or update signal, and/or a hang-up signal, and/or voice message, and/or display data.

The wireless communications between one and or group of several mobile phones can be remotely controlled. In one or more aspects it can provide a history of one and or group of several mobile phone locations and or speed, and can provide relative locations and or speed between one and or group of several mobile phones. In other aspect it can also transmit and receive an SMS messages, and/or voice messages, and/or phone calls, and/or a hang-up signals, and/or reset signals, and/or display messages, between one and or group of several mobile phones to indicate that their relative speed and locations are in danger.

One or more aspects also can provide threshold locations as hazardous locations, locations of privacy, and locations of danger to improve safety of public, police, fire department, and military personnel.

One or more aspects can continually provide additional systems, such as traffic signals system, classified systems, military systems, police and/or fire departments systems, public service systems, ambulances systems, airport safety systems, with the mobile phone's space coordinates, speed, location and speed thresholds, and/or locations and speeds deviation.

While the above description contains many specificities, these should not be construed as limitations on the scope of any aspects of the invention, but as exemplifications of the presently preferred embodiments. Many other ramifications and variations are possible. For example, the communication can occur over the Internet with wireless links between portable computers, laptop computers, and notebook computers. Another example occurs when the locations of military mines, underground and above-ground gas tanks, treasure locations, food and water locations, and forbidden spaces and flights spaces can be stored as threshold locations. An additional mode of operation can be employed by a fire department when the environment, such as a fire, a forest, and/or a battlefield will not allow a clear field of vision to people who are located in the field. A voice message can announce the relative locations and speed of people, machinery, cars, and airplanes when vision is limited. This can also alert and/or update persons when family members are in danger. It can prevent air show, acrobatic show, airplane, car racing, and train collisions, and or prove a back-up to existing systems. An additional mode of operation can be employed by Ambulance and public safety systems, to control traffic signals by forcing the traffic signals to be green along the path identified by the threshold and location deviations.

Thus the scope of the invention should be determined by the appended claims and their legal equivalents, and not by the examples given.

The invention claimed is:

1. A method for controlling a wireless mobile phone, comprising:
 (a) providing a wireless mobile phone with an on-board memory,
 (b) said wireless mobile phone including a transmitter and a receiver for communicating with a base station,
 (c) providing said wireless mobile phone with a sensing unit for continuously and repeatedly sensing the space coordinates of said wireless communication mobile phone,
 (d) determining the times at which each sensing of said space coordinates was made,
 (e) storing the resultant space coordinates and corresponding respective time values in said on-board memory,
 (f) said on-board memory being capable of storing said resultant space coordinates and corresponding respective time values,
 (g) sending said space coordinates and respective time values to a remote location selected from the group consisting of said base station and another wireless mobile phone,
 (h) providing said wireless mobile phone or said base station with an arithmetic logic unit for continually calculating said wireless mobile phone's speed of movement in accordance with said space coordinates and said time values and
 (i) storing said speed of movement in said on-board memory or said base station,
 (j) providing said wireless mobile phone with an interrupt unit for receiving an interrupt signal, and
 (k) providing an interrupt signal to said wireless mobile phone in response to said mobile phone's speed of movement exceeding a predetermined value and becoming a hazardous form of communication that endangers life,
 (l) said interrupt unit in said wireless mobile phone arranged to receive said interrupt signal and, in response thereto, cause a hang-up signal to be cross transmitted and received for forcing hang-up of said phone and also for continually updating information about said hang-up of said phone to said remote location,
 (m) whereby said base station or said other wireless mobile phone will be updated with information that the user of said wireless mobile phone is speeding and said phone has been forced into said hang-up or on-hook state.

2. The method of claim 1 wherein said interrupt unit in said wireless mobile phone is also arranged to cause said wireless mobile phone to cross-transmit and receive said space coordinates and said time values to and from said remote location.

3. The method of claim 1 wherein said interrupt unit in said wireless mobile phone is also arranged to cause said wireless mobile phone to cross-transmit and receive a special ring to said remote location.

4. The method of claim 3 wherein said wireless mobile phone is also arranged to transmit said special ring to alert a user of said other wireless phone of a danger.

5. The method of claim 1, further including causing said wireless mobile phone to receive or transmit said interrupt signal from and to said remote location.

6. The method of claim 1 wherein said wireless mobile phone is arranged to cross-transmit or receive control signals selected from the group consisting of a sending message service, a sending message service alternative, a voice message, a phone call, a special ring, a reset signal, an update signal, a hang-up signal, a power off signal, a power on signal, disconnect signal, a texting signal, no signal, a null signal, a short signal, a ground signal, a control signal, a central office control signal, a central office control signal alternative, a central office drop communication, and a display on said wireless mobile phone to said other location.

7. The method of claim 1 wherein said interrupt signal is selected from the group consisting of a sending message service, a sending message service alternative, a voice message, a phone call, a special ring, a reset signal, an update signal, a hang-up signal, a power off signal, a power on signal, disconnect signal, connect signal, texting signal, no signal, null signal, short signal, ground signal, control signal, central office control signal, central office control signal alternative, central office drop communication, and a display on said wireless communication mobile phone.

8. A method for controlling a wireless communication mobile phone, comprising:
  (a) providing a wireless communication mobile phone with an on-board memory and a transmitter and a receiver for communicating with a base station,
  (b) providing said wireless communication mobile phone with a sensing unit for continuously and repeatedly sensing the space coordinates of said wireless communication mobile phone, measuring the time at which each sensing of said space coordinates was made, storing the resultant space coordinates and corresponding respective time values in said on-board memory, and sending said space coordinates to another location selected from the group consisting of said base station and another wireless mobile phone,
  (c) said on-board memory being capable of storing said resultant space coordinates and corresponding respective time values, and
  (d) providing said wireless communication mobile phone or said base station with an arithmetic logic unit for continually calculating said wireless communication mobile phone's speed of movement in accordance with said space coordinates and said time values and storing said speed of movement in said on-board memory or said base station,
  (e) providing an interrupt signal to said wireless mobile phone in response to said mobile phone's speed of movement exceeding a predetermined value, and
  (f) providing said wireless communication mobile phone with an interrupt unit for (a) receiving said interrupt signal in response to said mobile phone's speed of movement exceeding a predetermined value, and (b) forcing, in response to receipt of said interrupt signal, said wireless communication mobile phone to go into a hang-up or on-hook state where said wireless mobile phone will continue to transmit information about said hang-up of said phone to said other location,
  (g) whereby said wireless communication mobile phone will be forced into said hang-up or on-hook state when said speed of movement exceeds said predetermined value, so that said phone cannot be used for human communication but its location will continue to be sensed so that public safety is enhanced.

9. The method of claim 8 wherein said interrupt unit in said wireless mobile phone is also arranged to receive said interrupt signal and cause said wireless mobile phone to continue to (1) sense and send the space coordinates and time values of said mobile phone to said other location, (2) cross-transmit and receive a special ring to said other wireless mobile phone, and (3) cross transmit and receive a hang-up signal to said other wireless mobile phone, whereby a caller from said other wireless mobile phone will be updated with information that the user of said first-named wireless mobile phone is speeding.

10. The method of claim 9 wherein said wireless mobile phone is also arranged to transmit a special ring to alert the user of said other wireless phone of a danger.

11. The method of claim 8 wherein wireless communication mobile phone is also arranged to receive or transmit said interrupt signal from and to said other location.

12. A system for controlling a wireless communication mobile phone, comprising:
  (a) a wireless communication mobile phone with an on-board memory, and a transmitter and a receiver for communicating with a base station,
  (b) said wireless communication mobile phone containing a sensing unit for continuously and repeatedly sensing the space coordinates of said wireless communication mobile phone and measuring the time at which each sensing of said space coordinates was made, storing the resultant space coordinates and corresponding respective time values in said on-board memory, and sending said space coordinates to another location selected from the group consisting of said base station and another wireless mobile phone,
  (c) said on-board memory being capable of storing said resultant space coordinates and corresponding respective time values, and
  (d) an arithmetic logic unit in said wireless communication mobile phone or said base station, said arithmetic logic unit arranged to continually calculating said wireless communication mobile phone's speed of movement in accordance with said space coordinates and said time values and storing said speed of movement in said on-board memory or said base station,
  (e) means for providing an interrupt signal to wireless mobile phone in response to said mobile phone's speed of movement exceeding a predetermined value,
  (f) an interrupt unit in said wireless communication mobile phone, said interrupt unit arranged to (a) receive said interrupt signal in response to said mobile phone's speed of movement exceeding a predetermined value, and (b) force, in response to receipt of said interrupt signal, said wireless communication mobile phone to go into a hang-up or on-hook state where said wireless mobile phone will continue to transmit information about said hang-up of said phone to said other location, (g) whereby said wireless communication mobile phone will be forced into said hang-up or on-hook state when said speed of movement exceeds said predetermined value, so that said phone cannot be used for human communication but its location will continue to be sensed so that public safety is enhanced.

13. The system of claim 12 wherein said interrupt unit in said wireless mobile phone is also arranged to receive said interrupt signal and cause said wireless mobile phone to cross-transmit and receive said space coordinates and said time values to said other location, whereby a caller from said other location will be updated with information that the user of said first-named wireless mobile phone is speeding.

14. The system of claim 12 wherein said interrupt unit in said wireless mobile phone is also arranged to receive said interrupt signal and cause said wireless mobile phone to cross-transmit and receive a special ring to said other location, whereby a caller from said other wireless mobile phone will be updated with information that the user of said first-named wireless mobile phone is speeding.

15. The system of claim 14 wherein said wireless mobile phone is arranged to transmit said special ring to alert the user of said other wireless phone of a danger.

16. The system of claim 12 wherein said wireless communication mobile phone is arranged to transmit said interrupt signal from and to said other location.

17. The system of claim 12 wherein said wireless mobile phone is arranged to cross-transmit or receive control signals selected from the group consisting of a sending message service, an sending message service alternative, a voice message, a phone call, a special ring, a reset signal, an update signal, a hang-up signal, a power off signal, a power on signal, disconnect signal, a texting signal, no signal, a null signal, a short signal, a ground signal, a control signal, a central office control signal, a central office control signal alternative, a central office drop communication, and a display on said wireless communication mobile phone to said other location.

18. The system of claim 13 wherein said interrupt signal is selected from the group consisting of a sending message service, a sending message service alternative, a voice message, a phone call, a special ring, a reset signal, an update signal, a hang-up signal, a power off signal, a power on signal, disconnect signal, connect signal, texting signal, no signal, null signal, short signal, ground signal, control signal, central office control signal, central office control signal alternative, central office drop communication, and a display on said wireless communication mobile phone.

* * * * *

UNITED STATES PATENT AND TRADEMARK OFFICE
CERTIFICATE OF CORRECTION

| | |
|---|---|
| PATENT NO. | : 8,442,511 B2 |
| APPLICATION NO. | : 11/470060 |
| DATED | : May 14, 2013 |
| INVENTOR(S) | : R. Woods et al. |

It is certified that error appears in the above-identified patent and that said Letters Patent is hereby corrected as shown below:

Title Page

Abstract, line 5, change "locations" to --location--.

Abstract, line 10, change "cross transmit" to --cross-transmitted--.

Abstract, line 12, change "save" to --saving--.

Specification

Column 1, line 51, Change "updates" to --update--.

Column 2, lines 41-42, change "laptop, (notebook), pocket computer," to --laptops (notebooks), pocket computers--.

Column 2, line 48, change "screen" to --screens--.

Column 7, line 18, change "The interrupts" to --The interrupt--.

Column 7, line 38, change "accurse" to --occurs--.

Column 9, line 48, change "5 Mbytes points Interrupt #1" to --the 5 Mbyte point (Interrupt #1)--.

Column 13, line 23, before "the" insert --of--.

Column 14, line 7, change "flights" to --flight--.

Claims

Column 14, line 33; Claim 1, line 9, delete "communication".

Column 14, line 56; Claim 1, line 32, after "in response to said" insert --wireless--.

Column 14, lines 63 & 64-65; Claim 1, lines 39 & 40-41, after "hang-up of said" insert --wireless mobile--.

Column 15, line 1; Claim 1, line 44, after "and said" insert --wireless mobile--.

Column 15, line 13; Claim 4, line 3, after "wireless" insert --mobile--.

Signed and Sealed this
Fourteenth Day of June, 2016

Michelle K. Lee
*Director of the United States Patent and Trademark Office*

CERTIFICATE OF CORRECTION (continued)
U.S. Pat. No. 8,442,511 B2

Column 15, lines 52 and 63; Claim 8, lines 15 and 26, after "wireless" insert --communication--.

Column 15, line 64, and column 16, line 1; Claim 8, lines 27 and 31, after "said" insert --wireless communication--.

Column 16, line 5; Claim 8, line 35, after "wireless" insert --communication--.

Column 16, line 6; Claim 8, line 36, after "said hang-up" insert --or on-hook state--.

Column 16, lines 7 and 11; Claim 8, lines 37 and 41, after "said" insert --wireless communication mobile--.

Column 16, lines 15 and 16; Claim 9, lines 2 and 3, after "wireless" insert --communication--. Column 16, line 18; Claim 9, line 5, change "said mobile" to --said wireless communication mobile--. Column 16, lines 19, 21, 22, and 23; Claim 9, lines 6, 8, 9, and 10, after "wireless" insert --communication--.

Column 16, line 25; Claim 10, line 1, after "wireless" insert --communication--.

Column 16, line 27; Claim 10, line 3, after "wireless" insert --communication mobile--.

Column 16, line 56; Claim 12, line 26, after "wireless" insert --communication--.

Column 16, line 57; Claim 12, line 27, and column 16, line 61; Claim 12, line 31, after "said" insert --wireless communication--.

Column 16, line 65; Claim 12, line 35, after "wireless" insert --communication--.

Column 16, line 66; Claim 12, line 36, after "said hang-up" insert --or on-hook state--.

Column 16, line 67, and column 17, line 4; Claim 12, lines 37 and 41, change "said phone" to --said wireless communication mobile phone--.

Column 17, lines 8, 9, and 13; Claim 13, lines 2, 3, and 7, after "wireless" insert --communication--.

Column 17, lines 15, 16, 18, and 20; Claim 14, lines 2, 3, 5, and 7, after "wireless" insert --communication--.

Column 17, line 21; Claim 15, line 1, after "wireless" insert --communication--.

Column 17, line 23; Claim 15, line 3, after "wireless" insert --communication mobile--.

Column 18, line 4; Claim 17, line 1, after "wireless" insert --communication--.